(12) United States Patent
Fratti et al.

(10) Patent No.: US 8,315,133 B2
(45) Date of Patent: Nov. 20, 2012

(54) CONTROLLING AN OPTICAL-DISC READER USING SURFACE MARKS

(75) Inventors: Roger A. Fratti, Mohnton, PA (US); John A. Michejda, Berkeley Heights, NJ (US)

(73) Assignee: LSI Corporation, Milpitas, CA (US)

( * ) Notice: Subject to any disclaimer, the term of this patent is extended or adjusted under 35 U.S.C. 154(b) by 0 days.

(21) Appl. No.: 12/500,089

(22) Filed: Jul. 9, 2009

(65) Prior Publication Data

US 2010/0278021 A1 Nov. 4, 2010

Related U.S. Application Data

(60) Provisional application No. 61/174,568, filed on May 1, 2009.

(51) Int. Cl.
G11B 5/09 (2006.01)
(52) U.S. Cl. .................................................. 369/47.15
(58) Field of Classification Search ........................ None
See application file for complete search history.

(56) References Cited

U.S. PATENT DOCUMENTS

| | | | | |
|---|---|---|---|---|
| 4,677,604 A | * | 6/1987 | Selby et al. | 369/30.27 |
| 4,872,151 A | * | 10/1989 | Smith | 369/14 |
| 5,282,187 A | * | 1/1994 | Lee | 369/52.1 |
| 5,288,107 A | * | 2/1994 | Johnson et al. | 283/114 |
| 5,489,768 A | * | 2/1996 | Brownstein et al. | 235/462.01 |
| 5,689,484 A | * | 11/1997 | Hirasawa | 369/30.3 |
| 5,694,381 A | | 12/1997 | Sako | |
| 5,815,484 A | | 9/1998 | Smith et al. | |
| 5,822,287 A | | 10/1998 | Kubota et al. | |
| 6,028,620 A | | 2/2000 | Yin | |
| 6,070,799 A | * | 6/2000 | Ashe | 369/47.12 |
| 6,122,373 A | | 9/2000 | Gotoh et al. | |
| 6,295,262 B1 | | 9/2001 | Kusumoto et al. | |
| 6,493,506 B1 | | 12/2002 | Schoner et al. | |

(Continued)

FOREIGN PATENT DOCUMENTS

DE 3842149 A1 6/1990

(Continued)

OTHER PUBLICATIONS

European Search Report received in EP 10 16 1581.3 filed Apr. 30, 2010.

(Continued)

*Primary Examiner* — Joseph Feild
*Assistant Examiner* — Henok Heyi
(74) *Attorney, Agent, or Firm* — Mendelsohn, Drucker & Associates, P.C.; Edward J. Meisarosh; Steve Mendelsohn (57) ABSTRACT

An optical-disc player having a reader and a controller. The reader derives out-of-band information from surface marks of an optical disc, where the controller controls operations of the reader based on the derived information. The controlled operations may involve the reading and rendering of embedded data of the optical disc. For example, a person writes the words "Spanish" and "widescreen" on the surface of a DVD with a marker and inserts the DVD in a DVD player. The DVD player scans the surface of the DVD and sends the resulting image data to an optical character recognition (OCR) module. The OCR module outputs a text file containing the words "Spanish" and "widescreen" to a controller (e.g., Microsoft HDi runtime). In response, the controller sets the playback language to Spanish and the screen format to widescreen.

15 Claims, 6 Drawing Sheets

U.S. PATENT DOCUMENTS

| | | |
|---|---|---|
| 6,756,103 B2 | 6/2004 | Thompson et al. |
| 7,016,294 B2 | 3/2006 | Blankenbeckler et al. |
| 7,596,069 B2 | 9/2009 | Steenbergen et al. |
| 2003/0179688 A1 | 9/2003 | Blankenbeckler et al. |
| 2005/0050343 A1 | 3/2005 | Selinfreund et al. |
| 2006/0136746 A1 | 6/2006 | Al-Khateeb |
| 2007/0025213 A1 | 2/2007 | Morino et al. |
| 2008/0117791 A1 | 5/2008 | Wang et al. |
| 2009/0097376 A1 | 4/2009 | Yamaoka et al. |
| 2009/0327761 A1 | 12/2009 | Adachi |

FOREIGN PATENT DOCUMENTS

| | | | |
|---|---|---|---|
| DE | EP0532997 A1 | * | 3/1993 |
| EP | 0 523 492 A1 | | 1/1993 |
| EP | 0 532 997 A1 | | 3/1993 |
| EP | 0940810 A1 | | 9/1999 |
| EP | 0971345 A1 | | 1/2000 |
| EP | 1879186 A1 | | 1/2008 |
| JP | 03083243 A | * | 4/1991 |
| JP | 05258390 A | * | 10/1993 |
| JP | 09-007288 A | | 1/1997 |
| JP | 2006252621 A | * | 9/2006 |
| JP | 2006309806 | * | 11/2006 |
| JP | 2006309806 A | * | 11/2006 |
| JP | 2006310967 A | * | 11/2006 |
| JP | 2007200396 A | * | 8/2007 |
| WO | WO 93/02450 A1 | | 2/1993 |
| WO | WO 2006/064314 A1 | | 6/2006 |
| WO | WO 2008/096420 A1 | | 8/2008 |

OTHER PUBLICATIONS

European Summons for Oral Hearing; Mailed Jul. 5, 2012 for corresponding EP Application No. 10168908.1.

* cited by examiner

CONTROLLING AN OPTICAL-DISC READER USING SURFACE MARKS

CROSS-REFERENCE TO RELATED APPLICATIONS

This application claims the benefit of U.S. provisional application No. 61/174,568 filed on May 1, 2009, the teachings of which are incorporated herein by reference in their entirety.

The subject matter of this application is related to the subject matter of U.S. patent application Ser. No. 12/500,060, the teachings of which are incorporated herein by reference in their entirety.

BACKGROUND OF THE INVENTION

1. Field of the Invention

The invention relates to the writing of information to, and the reading of information from optical discs.

2. Description of the Related Art

Pre-recorded, read-only optical discs, such as the compact disc (CD) and digital versatile disc (DVD), are a popular medium for the storage and distribution of digital information, e.g., digitally encoded movies. The typical movie DVD offers the user multiple playback options, e.g., different dialogue languages (French, Spanish, etc.), different audio options (5.1 surround sound, stereo, etc.), different screen formats (widescreen, fullscreen), commentary on or off, subtitles on or off, etc. The typical process for changing a playback option is for the user to navigate through one or more on-screen menus using the player's controls or a remote control, a potentially tedious process. Typically, this process is performed when a disc is played on a particular player for the first time. Furthermore, for those players that cannot remember settings for a particular disc, the user might have to repeat the playback-option setting process every time the disc is inserted in the player.

SUMMARY OF THE INVENTION

In one embodiment, the invention is a player-implemented method for controlling operation of an optical-disc player having an optical-disc reader. The method derives out-of-band information from surface marks of an optical disc and uses the derived out-of-band information to control the operation of the optical-disc reader.

In another embodiment, the invention is an optical-disc player comprising (i) an optical-disc reader adapted to derive out-of-band information from surface marks of an optical disc and (ii) a controller adapted to control operation of the optical-disc reader based on the derived out-of-band information.

In yet another embodiment, the invention is a user-implemented method of using an optical-disc player to playback an optical disc. The user applies, to the optical disc, surface marks corresponding to one or more selected playback options. The user then operates the optical-disc player to enable the optical-disc player to (i) derive, from the surface marks, out-of-band information corresponding to the one or more selected playback options and (ii) control the rendering of embedded data of the optical disc based on the out-of-band information to implement the one or more selected playback options.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

DETAILED DESCRIPTION

Figure 1:
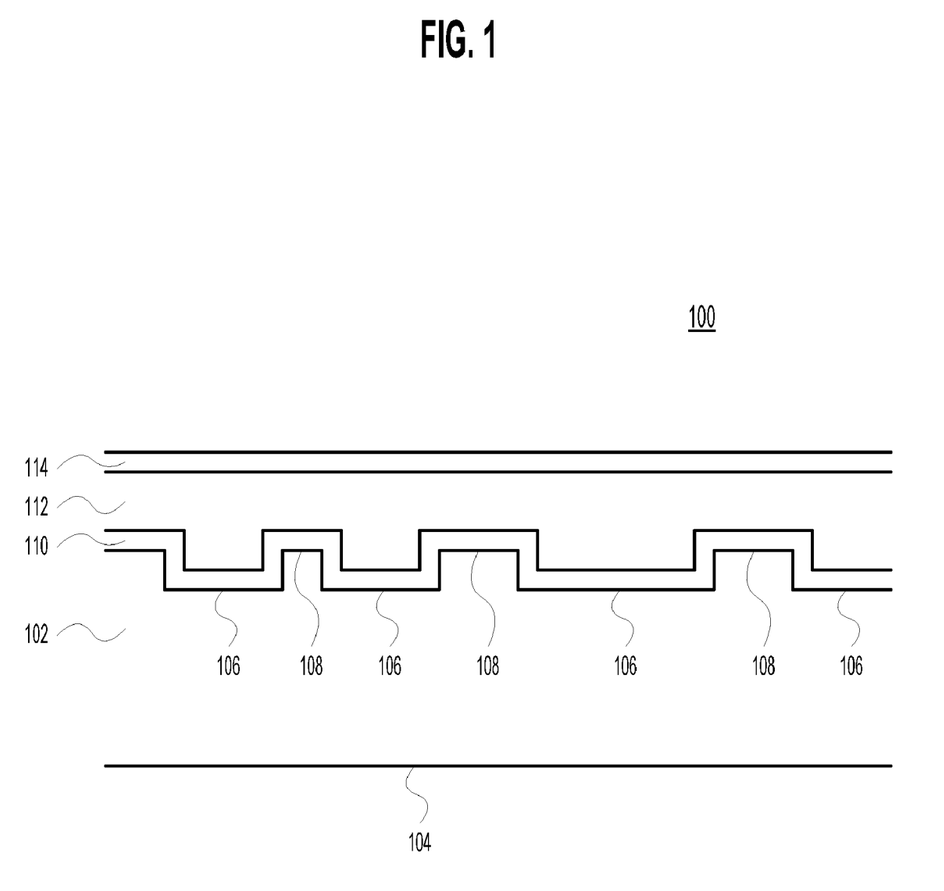
FIG. 1 is a cross-section of a typical read-only optical disc 100.

FIG. 1 is a cross-section of a typical read-only optical disc 100. Optical disc 100 is a flat, circular disc comprising several layers. Bottom-most layer 102 is clear polycarbonate plastic. The bottom surface 104 of layer 102 (i.e., the bottom surface of disc 100) is smooth. Data is typically stored as a single, continuous, spiral track of pits 106 and lands 108 etched on the top surface of layer 102. Data stored in this manner is referred to as the embedded data. The dimensions of the pits and lands depend on the specific optical-disc format. On a CD, pits are 100 nanometers deep, 500 nanometers wide, and a minimum of 850 nanometers long. On a DVD, pits are 120 nanometers deep, 320 nanometers wide, and a minimum of 400 nanometers long.

Layer 110 is a reflective material, typically aluminum. Layer 112 is an acrylic layer that protects reflective layer 110. Optional layer 114 is a label or printing.

A disc player is a system for reading and outputting the information stored on an optical disc. A disc player can be a self-contained device, e.g., a standalone DVD player, or it can be a subsystem of a larger system, e.g., the CD reader and associated software within a personal or laptop computer. A disc player can include the components necessary to render in-band data, e.g., a DVD player with a built-in monitor, or it cannot, e.g., a standalone DVD player.

Figure 2:
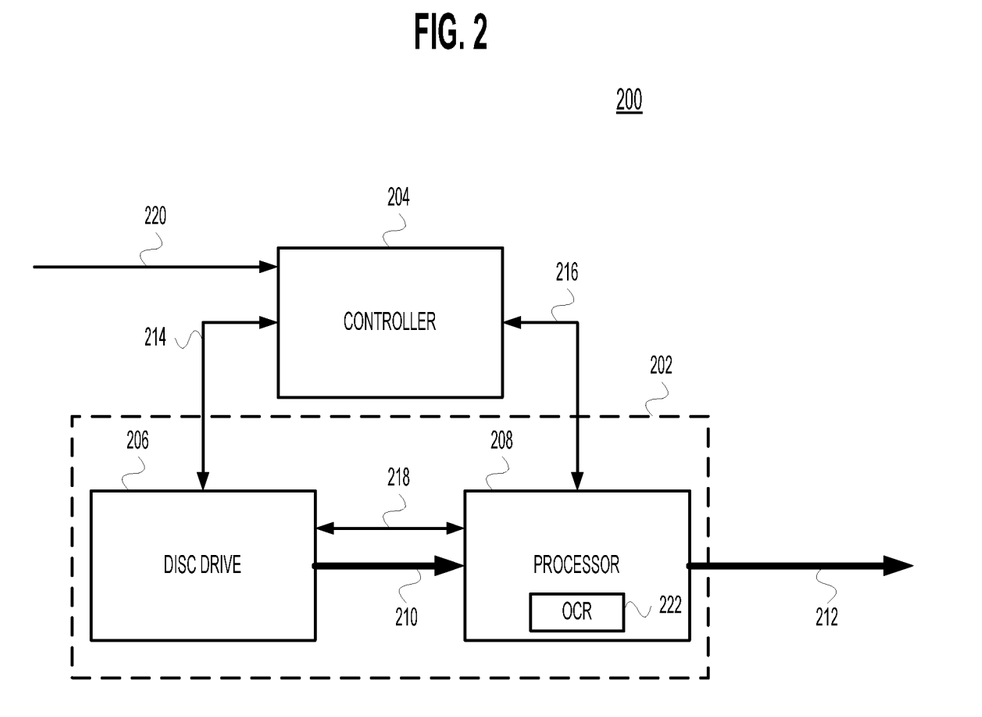
FIG. 2 is a block diagram of disc player 200 according to one embodiment of the present invention.

FIG. 2 is a block diagram of disc player 200 according to one embodiment of the present invention. Disc player 200 comprises disc reader 202 and controller 204. Disc reader 202 comprises disc drive 206 and signal processor 208. Signal processor 208 contains an optical character recognition (OCR) module 222.

The data flows of disc player 200 are typically either in-band data or out-of-band data. In-band data refers to data that is outputted by the disc player, e.g., a movie displayed on a screen or music played over speakers. In FIG. 2, disc drive 206 reads the embedded data on an optical disc and outputs in-band data 210 to processor 208. Processor 208 performs one or more processing operations (e.g., error-detection/correction, decoding, digital-to-analog conversion) on in-band data 210 and outputs processed in-band data 212.

Out-of-band data refers to data that controls the operation of the disc player. Out-of-band data, e.g., data 214, 216, or 218, might be generated by any of controller 204, disc drive 206, or processor 208, respectively. Alternatively or in addition, out-of-band data, e.g., data 220, might be received from a source outside disc player 200.

Controller 204 controls the operations of both disc drive 206 and processor 208. For example, controller 204 might be an executable program that receives out-of-band data 220 from an infrared remote-control device and displays various playback options on a screen. A user uses the remote control to select playback options. The controller converts the selected playback options into out-of-band data 214 to disc drive 206 and out-of-band data 216 to processor 208.

Disc drive 206 is an electromechanical assembly comprising three major components (not shown): the drive motor, the tracking mechanism, and the lens assembly. The drive motor rotates the disc. The tracking mechanism moves the lens assembly along the spiral track of embedded data, and adjusts the distance between the disc surface and the lens assembly, e.g., to focus the lens assembly. The lens assembly comprises (i) one or more light sources (e.g., lasers), (ii) one or more lenses, and (iii) one or more optical sensors (e.g., photodiodes).

Disc drive 206 is adapted to read the embedded data of an optical disc and executes a read process to read the embedded data. The drive motor spins the optical disc, and keeps the disc spinning for the duration of the read process. The tracking mechanism moves the lens assembly to the correct location adjacent to the optical disc for reading the data. The tracking mechanism focuses the lens assembly on the pits and lands embedded within the disc. The laser(s) in the lens assembly shoot light upwards at reflective layer 110 through clear polycarbonate 102. The reflective layer reflects the light back to the lens assembly. Pits 106 and lands 108 alter the reflected light. The photodiodes within the lens assembly detect the alterations in the reflected light and output a corresponding electrical signal.

The area of an optical disc which the lens assembly can read is known as the readable area of the optical disc. The readable area is not necessarily the same as the area that contains embedded data, i.e., there might be areas on an optical disc to which embedded data cannot be or typically is not written, but which can nevertheless be read by the lens assembly.

Although a typical lens assembly is specifically adapted to read the nanometer-scale pits and lands of the embedded data of an optical disc, the lens assembly is not physically limited to read only the embedded data. The lens assembly also might be able to read surface marks made on the top or bottom surface of an optical disc that are within the readable area of the disc. For example, a word written in black ink on the bottom surface of an optical disc and within the readable area will most likely result in variations in the reflected light detected by the photodiodes of the typical lens assembly.

Embodiments of the present invention are methods and apparatuses, e.g., optical-disc players, for deriving out-of-band data from surface marks of an optical disc, and using the derived out-of-band data to control the operation of the disc player.

The surface marks may be any mark which can be detected, either by the typical lens assembly of a disc drive or by an additional/other detector system. The surface marks may be made in any manner, e.g., written by hand, printed, applied in the form of a sticker, etched, etc. The surface marks might be applied to either or both surfaces of the optical disc.

In certain embodiments of the present invention, surface marks are read using the same lens assembly that is used to read embedded data. In other embodiments of the present invention, other components, e.g., lasers, lenses, photodiodes, are added to the lens assembly for the specific purpose of reading surface marks. In yet other embodiments of the present invention, a mechanism for detecting surface-marks is added to the disc player separate from the lens assembly.

In those embodiments of the present invention where the lens assembly is used to read both embedded data and surface marks, the focus settings used by the lens assembly to read surface marks are the same as the focus settings used to read embedded data. In other embodiments of the present invention, the two focus settings are different. Specifically, when reading surface marks, the lens assembly is defocused, lowering the resolution of the lens assembly, but also reducing the time required to scan the entire disc. Since surface marks are typically significantly larger than the pits and lands typically read by the lens assembly, the loss of resolution does not affect the accuracy of the scanning of the surface marks.

Figure 3:
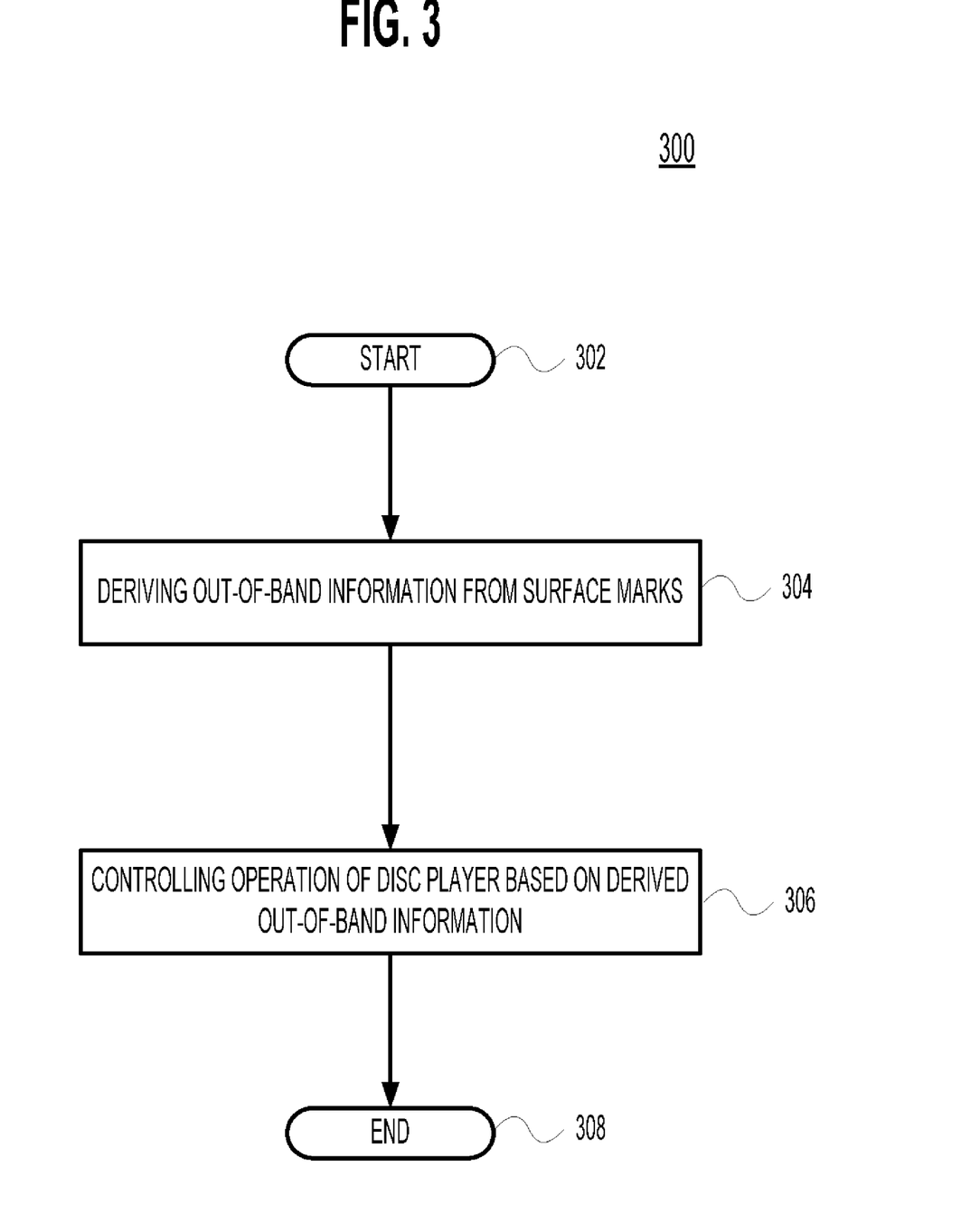
FIG. 3 is a functional flowchart of a disc player 200 of FIG. 2 according to various embodiments of the present invention.

FIG. 3 is a functional flowchart of a disc player 200 of FIG. 2 according to various embodiments of the present invention. Processing begins at step 302 and proceeds to step 304 where out-of-band information is derived from the surface marks of an optical disc. Next, at step 306, the derived out-of-band information is used to control the operation of a disc player. Processing then terminates at step 308.

Disc drive 206 is adapted to read surface marks, either with the same mechanism used to read embedded data or with a separate mechanism. Second, out-of-band signals 218 and/or 214 outputted by disc drive 206 might be derived from surface marks.

Figure 4:
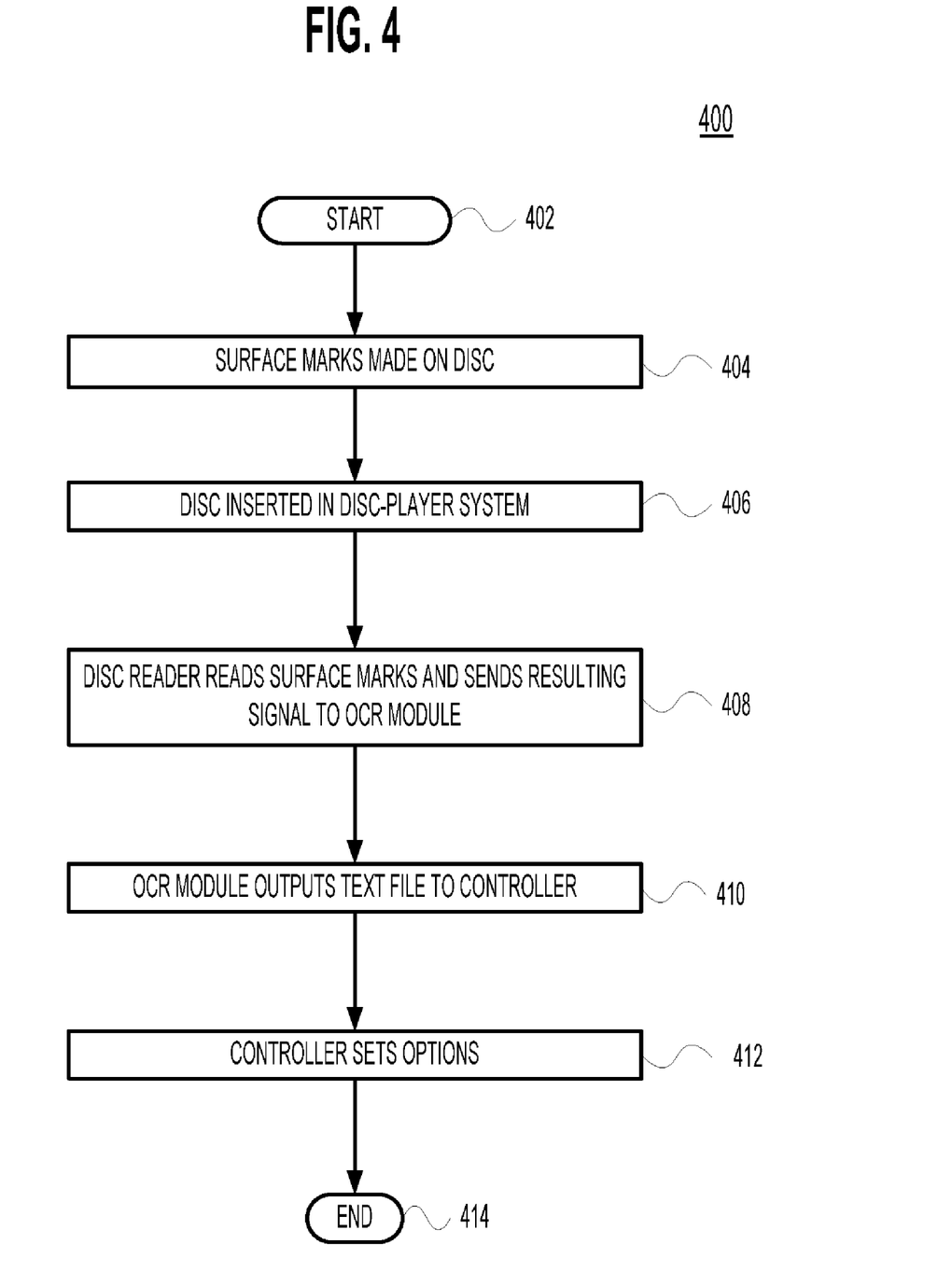
FIG. 4 is a flowchart describing one possible use of a disc player 200 of FIG. 2 according to one embodiment of the present invention.

FIG. 4 is a flowchart describing one possible use of a disc player 200 of FIG. 2 according to one embodiment of the present invention. Processing begins at step 402 and proceeds to step 404 where surface marks are made on an optical disc. Next, at step 406, the optical disc is inserted in disc player 200. Next, at step 408, the disc player reads the surface marks and sends the resulting image data (e.g., a bitmap) as out-of-band data 218 to processor 208 of FIG. 2, which processor comprises an optical character recognition (OCR) module 222. Next, at step 410, OCR module 222 converts the received bitmap to text and sends that text as out-of-band information 216 to controller 204. Next, at step 412, the controller parses the received text file, sets various controller parameters, e.g., playback options, and transmits those parameters to disc drive 206 (as out-of-band data 214) and/or processor 208 (as out-of-band data 216). Processing then terminates at step 414.

Figure 5:
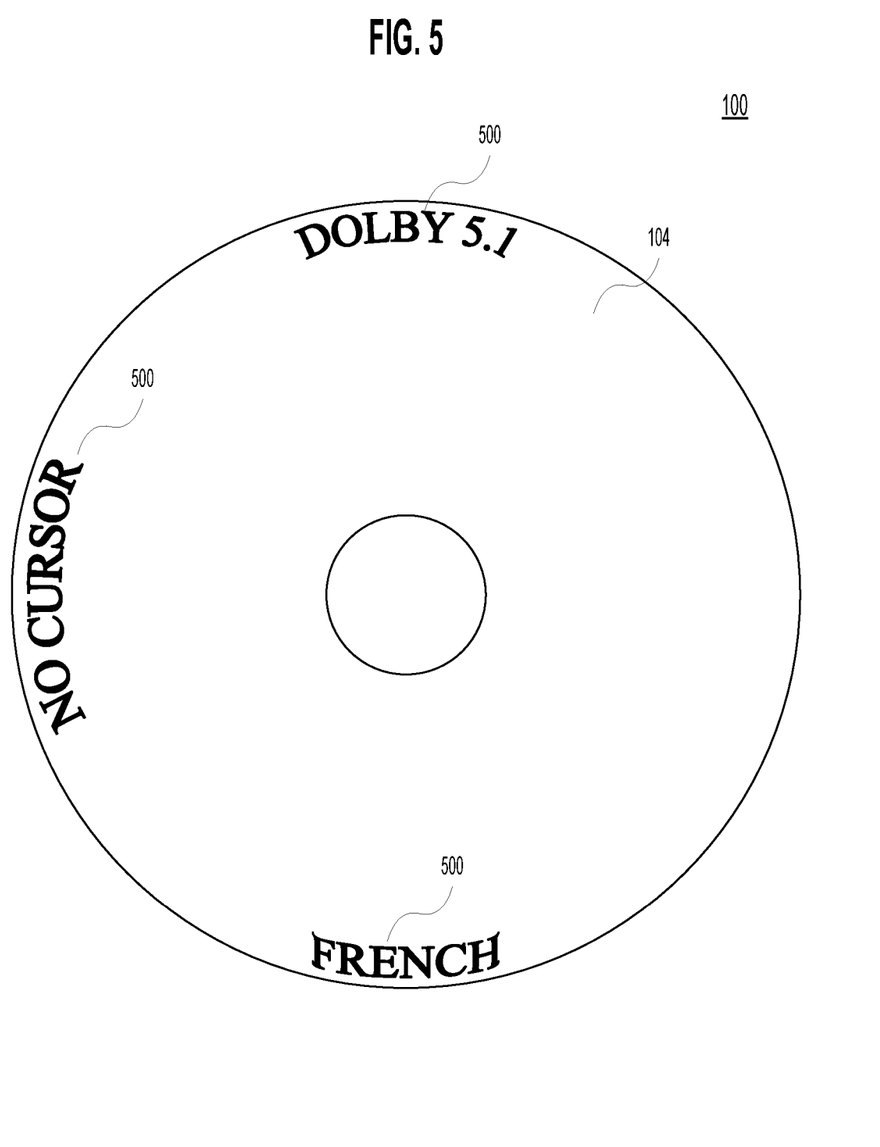
FIG. 5 is an example of the surface marks a user might make on optical disc 100 of FIG. 1 according to certain embodiments of the present invention.

FIG. 5 is an example of the surface marks a user might make on optical disc 100 of FIG. 1 according to certain embodiments of the present invention. The user makes three surface marks 500, "French," "Dolby 5.1," and "No cursor" on the bottom surface 104 of optical disc 100. The viewer inserts the disc into a standalone DVD player (the disc-player system) and presses PLAY.

Figure 6:
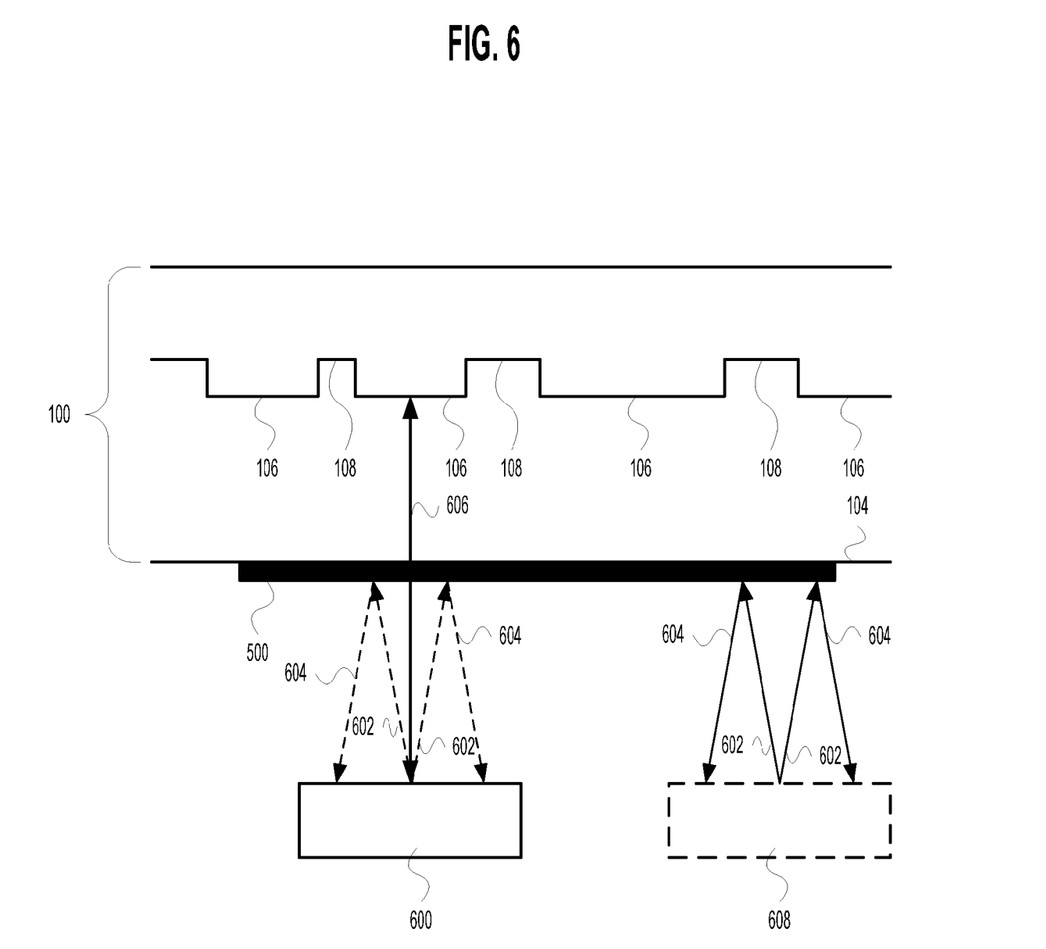
FIG. 6 is a depiction of lens assembly 600 reading surface mark 500 on disc 100.

FIG. 6 is a depiction of the reading of surface mark 500 on disc 100. The reading can be performed by a conventional lens assembly 600. When reading the embedded data of an optical disc, lens assembly 600 emits focused light 606 at pits 106 and lands 108. When reading surface marks, lens assembly 600 emits defocused light 602 at bottom surface 104 of disc 100, which surface contains surface mark 500. Alternatively, the disc reader might contain a separate imaging device 608 adapted to read only surface marks. Imaging device 608, too, emits defocused light 602 at bottom surface 104 of disc 100, which surface contains surface mark 500.

Lens assembly 600 or imaging device 608 detect variations in reflected light 604 and send the resulting bitmap as out-of-band data 218 to processor 208, which processor comprises an OCR module 222. The OCR module converts the bitmap into a text file and sends the text file as out-of-band data 216 to controller 204, e.g., Microsoft's HDi runtime program. The HDi runtime program parses the text file and (i) sets the dialogue language to French, (ii) sets audio to Dolby 5.1, and (iii) turns off the cursor.

In another example, the optical disc is an installation CD for a software program. A user writes a special unlock code on the surface of the installation CD and inserts the CD into disc drive 206, e.g., a CD player on the user's personal computer (PC). The CD player reads the surface marks, and OCR module 222 in processor 208 OCRs the bitmap and sends the unlock code to controller 204. Here, the controller is an executable installation program running on the PC. The installation program verifies the unlock code. If the verification succeeds, then installation proceeds. Otherwise, installation is halted.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium or loaded into and/or executed by a machine, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The invention claimed is:

1. A player-implemented method for controlling operation of an optical-disc player having an optical-disc reader, the method comprising:
   (a) deriving out-of-band information from surface marks forming alphanumeric characters on an optical disc, by:
      (i) generating image data corresponding to the surface marks; and
      (ii) optical-character-recognition (OCR) processing the image data to identify the alphanumeric characters; and
   (b) controlling the operation of the optical-disc reader based on the derived out-of-band information, wherein step (b) comprises setting one or more playback options associated with rendering embedded data read from the optical disc by the optical-disc reader.

2. The method of claim 1, wherein the one or more playback options comprise one or more of a language of the playback, whether to include subtitles in the playback, an audio format for the playback, a screen format for playback, and whether to include commentary in the playback.

3. An optical-disc player comprising:
   an optical-disc reader adapted to derive out-of-band information from surface marks forming alphanumeric characters on an optical disc, by:
      (i) generating image data corresponding to the surface marks; and
      (ii) optical-character-recognition (OCR) processing the image data to identify the alphanumeric characters of the surface marks; and
   a controller adapted to:
      control operation of the optical-disc reader based on the derived out-of-band information; and
      set one or more playback options associated with rendering embedded data read from the optical disc by the optical-disc reader.

4. The optical-disc player of claim 3, wherein the one or more playback options comprise one or more of a language of the playback, whether to include subtitles in the playback, an audio format for the playback, a screen format for playback, and whether to include commentary in the playback.

5. The optical-disc player of claim 3, wherein the optical-disc reader is adapted to read both embedded data of the optical disc and the surface marks.

6. The optical-disc player of claim 5, wherein the optical-disc reader comprises a lens assembly having a first optical path, the lens assembly adapted to generate:
   (i) at a first level of optical resolution using the first optical path, a first set of image data corresponding to the embedded data; and
   (ii) at a second level of optical resolution different from the first level, using the first optical path, a second set of image data corresponding to the surface marks.

7. The optical-disc player of claim 5, wherein the optical-disc reader comprises:
   (i) a lens assembly adapted to generate, at a first level of optical resolution, a first set of image data corresponding to the embedded data; and
   (ii) an imaging device, separate from the lens assembly, adapted to generate, at a second level of optical resolution different from the first level, a second set of image data corresponding to the surface marks.

8. The method of claim 1, wherein deriving out-of-band information comprises a lens assembly reading both embedded data of the optical disc and the surface marks by generating: (i) at a first level of optical resolution, a first set of image data corresponding to the embedded data; and (ii) at a second level of optical resolution different from the first level, a second set of image data corresponding to the surface marks.

9. An optical-disc player comprising:
an optical-disc reader adapted to derive out-of-band information from surface marks of an optical disc, wherein the optical-disc reader:
(a) is adapted to read both embedded data of the optical disc and the surface marks; and
(b) comprises a lens assembly having a first optical path, the lens assembly adapted to generate:
(i) at a first level of optical resolution using the first optical path, a first set of image data corresponding to the embedded data; and
(ii) at a second level of optical resolution different from the first level, using the first optical path, a second set of image data corresponding to the surface marks; and
a controller adapted to control operation of the optical-disc reader based on the derived out-of-band information.

10. A player-implemented method for controlling operation of an optical-disc player having an optical-disc reader, the method comprising:
(a) deriving out-of-band information from surface marks of an optical disc; and
(b) controlling the operation of the optical-disc reader based on the derived out-of-band information, wherein deriving out-of-band information comprises a lens assembly having a first optical path and reading both embedded data of the optical disc and the surface marks by generating: (i) at a first level of optical resolution, using the first optical path, a first set of image data corresponding to the embedded data; and (ii) at a second level of optical resolution different from the first level, using the first optical path, a second set of image data corresponding to the surface marks.

11. The method of claim 1, wherein the derived out-of-band information is in the form of text.

12. The player of claim 3, wherein the derived out-of-band information is in the form of text.

13. The player of claim 9, wherein the derived out-of-band information is in the form of text.

14. The method of claim 10, wherein the derived out-of-band information is in the form of text.

15. The method of claim 8, wherein:
the lens assembly has a first optical path;
the first set of image data is generated using the first optical path; and
the second set of image data is generated using the first optical path.

* * * * *